(12) United States Patent
Lin et al.

(10) Patent No.: US 7,670,053 B2
(45) Date of Patent: Mar. 2, 2010

(54) DETACHABLE ROLLING-ELEMENT RETAINER

(75) Inventors: Yun-Yin Lin, Taichung (TW); Jin-Sheng Chen, Taichung (TW)

(73) Assignee: Hiwin Technologies Corp., Taichung (TW)

(*) Notice: Subject to any disclaimer, the term of this patent is extended or adjusted under 35 U.S.C. 154(b) by 1290 days.

(21) Appl. No.: 11/158,019

(22) Filed: Jun. 20, 2005

(65) Prior Publication Data

US 2006/0285784 A1 Dec. 21, 2006

(51) Int. Cl.
*F16C 29/06* (2006.01)
(52) U.S. Cl. .............................. 384/45; 384/54; 384/59; 384/624
(58) Field of Classification Search ................... 384/21, 384/43, 44, 45, 49, 50, 54, 59; 312/334.44, 312/334.45, 334.46
See application file for complete search history.

(56) References Cited

U.S. PATENT DOCUMENTS

| | | | | | |
|---|---|---|---|---|---|
| 2,826,474 | A | * | 3/1958 | Haydu ................... 312/334.46 |
| 3,658,394 | A | * | 4/1972 | Gutner ........................ 384/21 |
| 4,655,613 | A | * | 4/1987 | Yokota ........................ 384/49 |
| 5,297,873 | A | * | 3/1994 | Komiya ....................... 384/45 |
| 5,395,170 | A | * | 3/1995 | Tamura et al. ................ 384/45 |
| 6,158,890 | A | * | 12/2000 | Hattori ........................ 384/45 |
| 6,764,151 | B2 | * | 7/2004 | Huang ................... 312/334.46 |
| 7,344,310 | B2 | * | 3/2008 | Mine ........................... 384/49 |

* cited by examiner

*Primary Examiner*—William C Joyce
(74) *Attorney, Agent, or Firm*—Charles E. Baxley

(57) ABSTRACT

A detachable rolling-element retainer comprises: a slide block defined with a slide groove in which disposed a plurality of rolling elements and a base inserted in the slide groove of the slide block. The base is provided at either end thereof with elastic deformable stopping portions. One of the stopping portions is positioned at an end of the slide block after being compressed in to and passing through the slide groove, while another one of the stopping portions is positioned at another end of the slide block, thus enabling the base of the rolling-element retainer to be inserted into or disengaged from the slide groove of the slide block easily while preventing disengagement of the rolling elements from the slide block.

9 Claims, 7 Drawing Sheets

DETACHABLE ROLLING-ELEMENT RETAINER

BACKGROUND OF THE INVENTION

1. Field of the Invention

The present invention relates to a detachable rolling-element retainer, with which, disengagement of rolling elements from the slide block can be prevented during assembly of the slid block.

2. Description of the Prior Arts

A conventional rolling element retainer used on a slide block as shown in FIG. 1 generally comprises an upper part 13, a pair of mid parts 14 and a pair of lower parts 15 that are disposed in a slide groove 12 of a slide block 11 and cooperate to prevent disengagement of the rolling elements from the slide block 11. However, this type slide block still has some disadvantages that need to be improved:

First, disposing the five parts of the retainer precisely in the rolling groove 12 of the slide block 11 is time consuming and requires high level of skill.

Second, the respective parts 13, 14 and 15 of the retainer have different shapes and only can be made by different modules, thus increasing the cost.

Third, once the retainer is disposed in the slide groove 12 of the slide block 11, it cannot be removed. Therefore, when the slide block 11 moves relative to the rail, the retainer inside the slide block 11 will interfere the rolling movement of the rolling elements thereof.

The present invention has arisen to mitigate and/or obviate the afore-described disadvantages.

SUMMARY OF THE INVENTION

The primary objective of the present invention is to provide a low cost rolling element retainer, besides being capable of preventing disengagement of the rolling element, the retainer is also detachable from the slide block, thus the slide block can be disengaged from the rail without taking off the rolling elements. Furthermore, many slide blocks of the same specification can share a retainer.

A detachable rolling-element retainer in accordance with the present invention comprises: a slide block defined with a slide groove in which disposed a plurality of rolling elements; and a base inserted in the slide groove of the slide block and provided at either end thereof with elastic deformable stopping portions, wherein one of the stopping portions is positioned at an end of the slide block after being compressed in to and passing through the slide groove, while another one of the stopping portions is positioned at another end of the slide block, thus enabling the base of the rolling-element retainer to be inserted into or disengaged from the slide groove of the slide block easily while preventing disengagement of the rolling elements from the slide block.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 2:
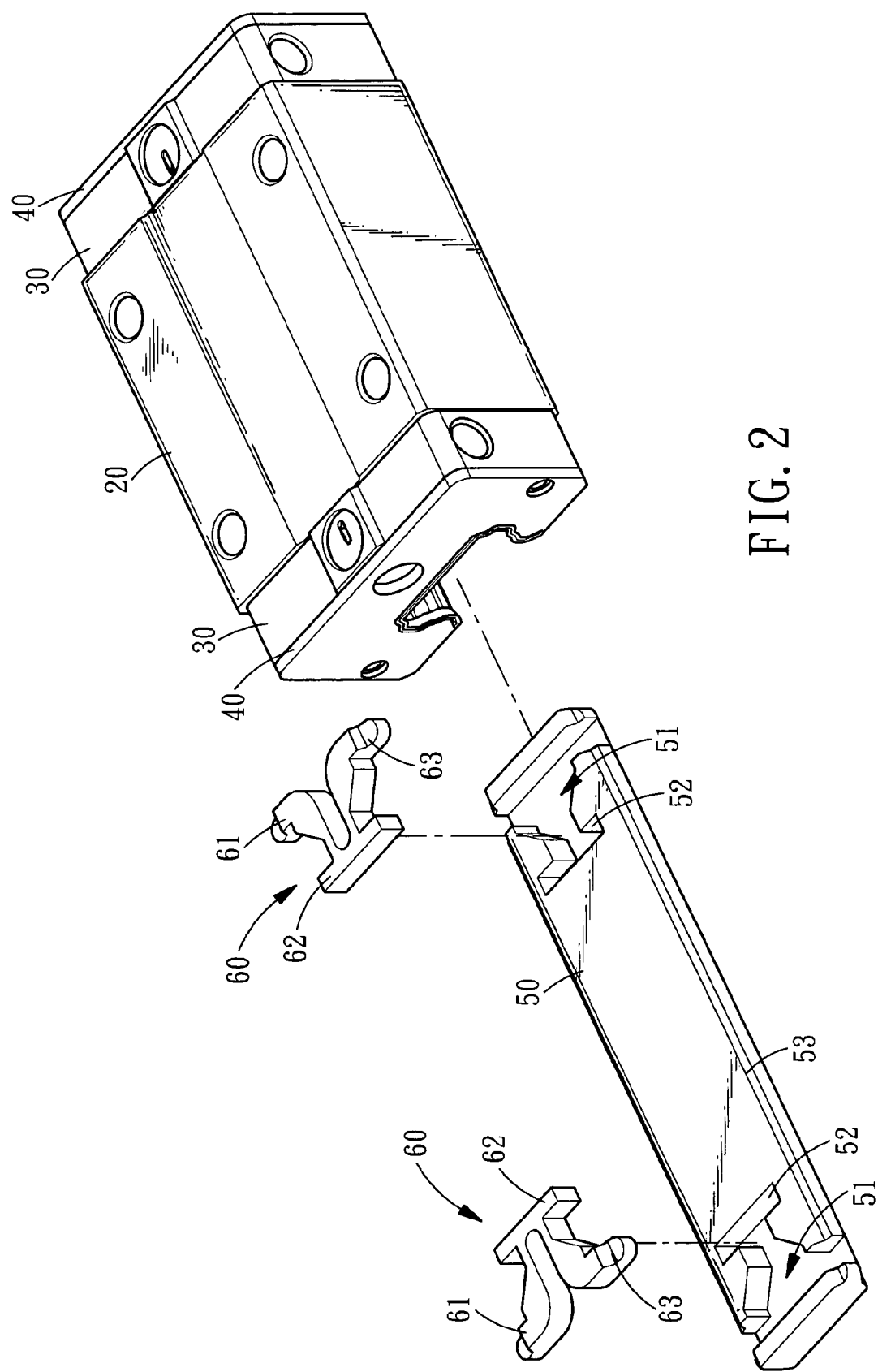
FIG. 2 is an exploded view of a rolling element retainer in accordance with a first embodiment of the present invention.
Figure 3:
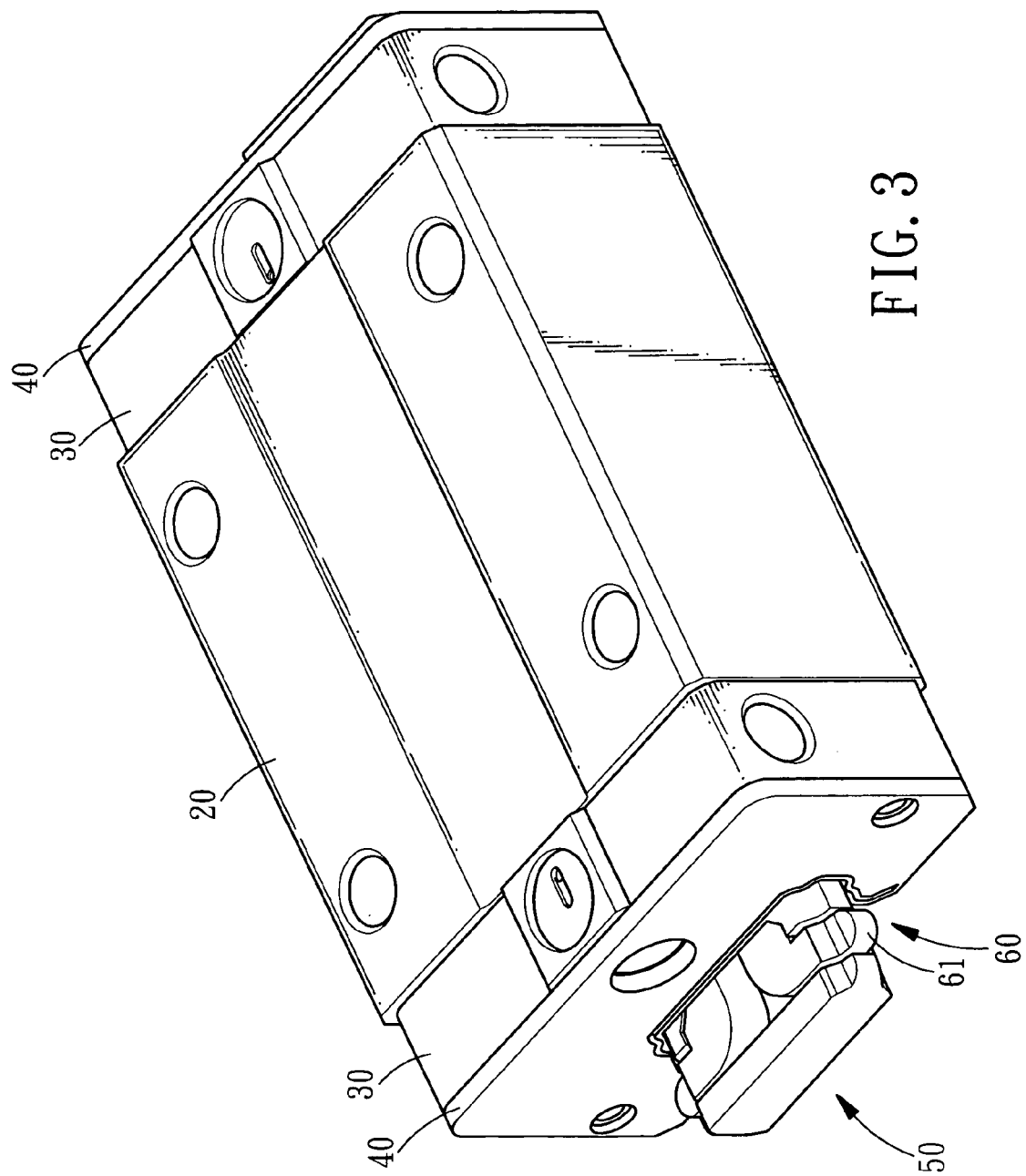
FIG. 3 is an assembly view of the rolling element retainer in accordance with the first embodiment of the present invention.

Referring to FIGS. 2 and 3, a detachable rolling-element retainer in accordance with a first preferred embodiment of the present invention is shown and comprises: a slide block 20, a pair of end caps 30, a pair of scrapers 40, a base 50 and a pair of stoppers 60.

Figure 4:
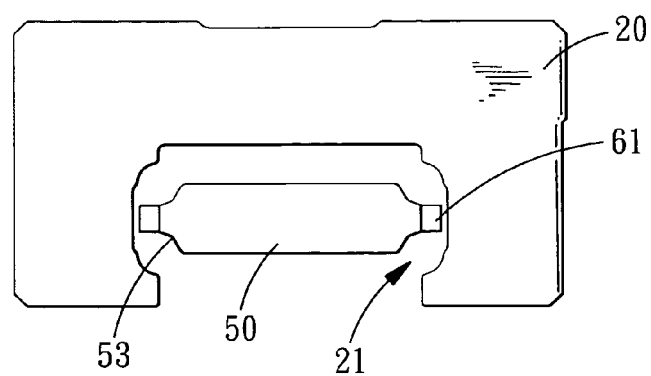
FIG. 4 is a side view in accordance with the first embodiment of the present invention of showing the rolling element retainer after being assembled on the slide block.

The slide block 20 is provided at its bottom with a slide groove 21 (with reference to FIG. 4), and to either end of the slide block 20 are attached the end cap 30 and the scraper 40.

The base 50 provided at either end thereof with a cavity 51 in which defined a positioning slot 52. The base 50 is moveably received in the slide groove 21 and provided with concave retaining portions 53 for mating with the sliding elements inside the slide groove 21 of the base 50.

Figure 7:
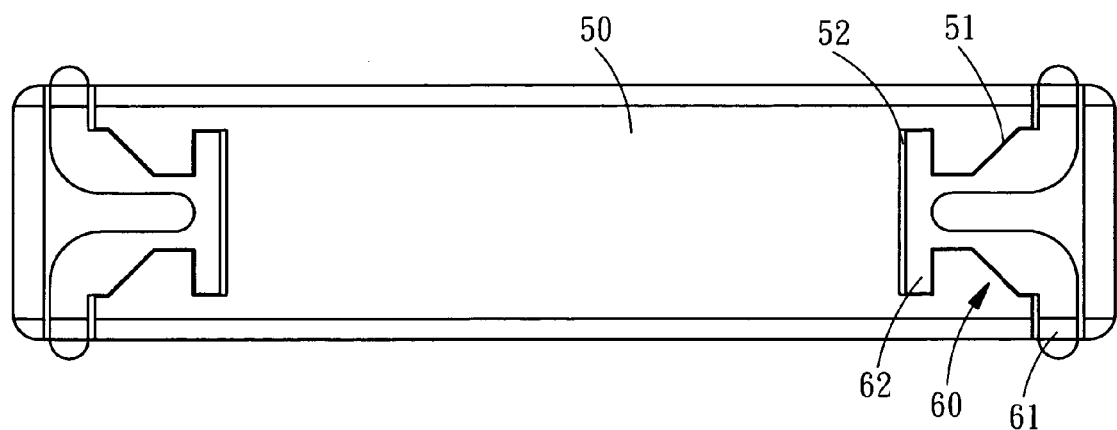
FIG. 7 is another assembly view of the rolling element retainer in accordance with the first embodiment of the present invention.
Figure 8:
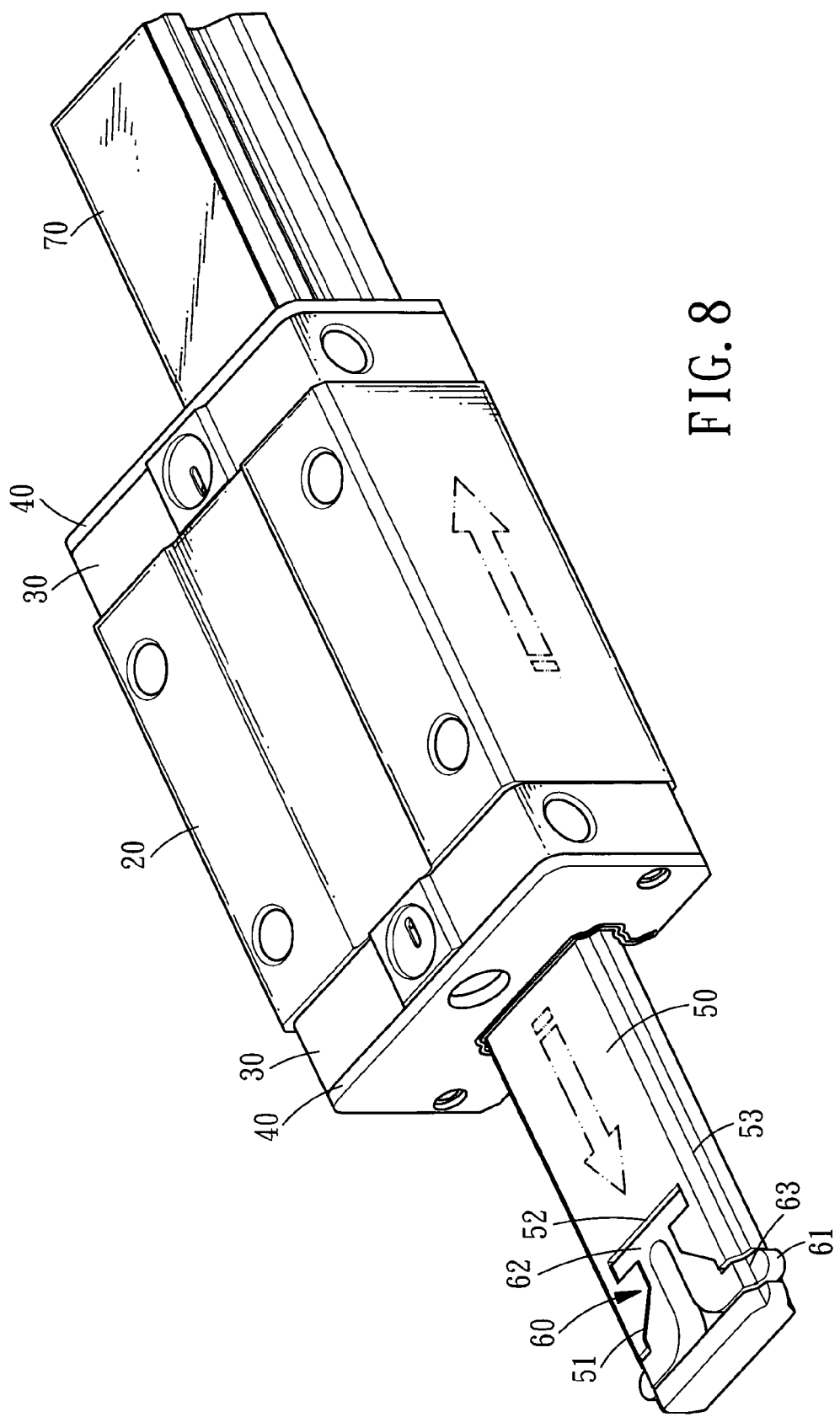
FIG. 8 is an operational view of the rolling element retainer in accordance with the first embodiment of the present invention.

The stoppers 60 each include a pair of flexible stopping portions 61 and a protrusive positioning portion 62 that are to be engaged in the positioning slots 52 of the cavities 51 of the base 50 (as shown in FIG. 7) in such manner that the stopping portions 61 of the stoppers 60 extend out of the cavities 51. The stopping portions 61 of the stoppers 60 have a circular arc outer periphery.

Figure 5:
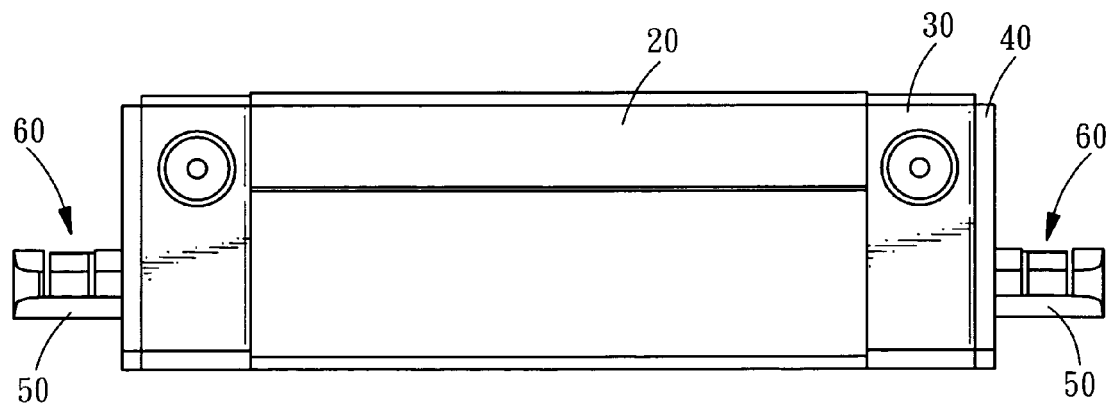
FIG. 5 is a front view in accordance with the first embodiment of the present invention of showing the rolling element retainer after being assembled on the slide block.
Figure 6:
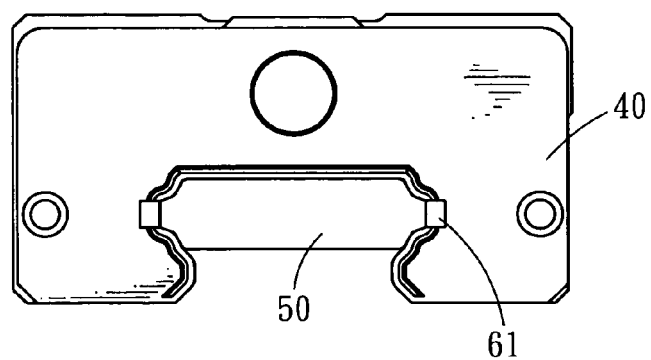
FIG. 6 is another side view in accordance with the first embodiment of the present invention of showing the rolling element retainer after being assembled on the slide block.

For a better understanding of the present invention, its operation and function, references should be made to FIGS. 2, 3 and 5, since the stopping portions 61 of the retainers 60 at either end of the base 50 are elastic and deformable, before the base 50 is moveably inserted in the slide groove 21 of the slide block 20, the stopping portions 61 of one of the retainers 60 will be compressed against the scraper 40 at one side of the slide block 50 (namely, the stopping portions 61 of one of the retainers 60 are compressed back into the slide groove 51 of the base 50). At this moment, the base 50 can be inserted into the slide groove 21 of the slide block 20 and the stopping portions 61 will be expanded after moving out of the scraper 40 at another side of the base 50. By such arrangements, the retainers 60 will be positioned outside the scrapers 40 at either side of the slide block 20, preventing disengagement of the base 50 from the slide groove 21 of the slide block 20.

Since the base 50 is provided with the concave retaining portions 53 for mating with the rolling elements, the rolling elements can be confined in the slide block 20 without disengagement therefrom.

To assemble the slide block 20 on the rail 70, the user can align the base 50 of the rolling-element retainer with the rail 70 initially, and then press the base 50 against the rail 70, or press the rail 70 against the base 50, so that the slide block 20 will be moveably forced onto the rail 70 while the base 50 and the stopper 60 will be forced out of the slide block 20.

Figure 1:
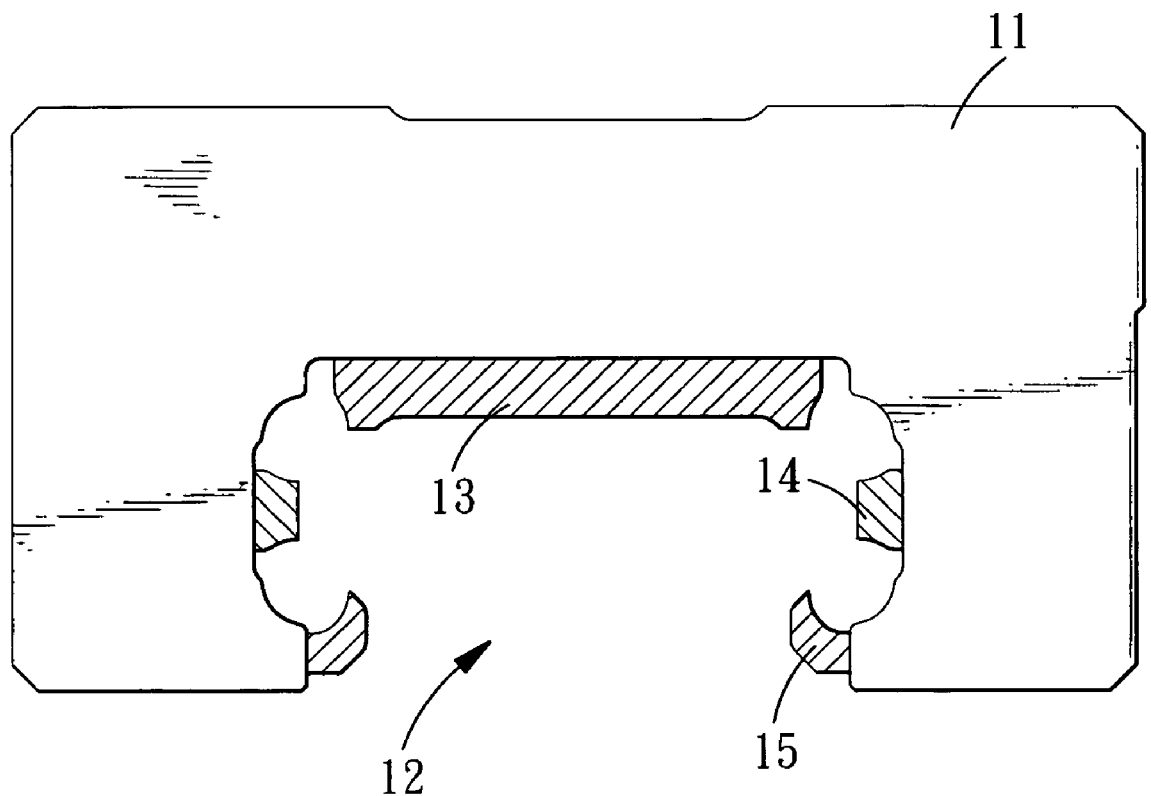
FIG. 1 is a cross sectional view of a conventional rolling element retainer disposed in a slide block.

Therefore, the slide block 20 doesn't need to be provided with the retaining structure of the conventional arts (as shown in FIG. 1), eliminating the interference between the conventional retainer and the rolling elements, thus allowing the slide block 20 to be slide on the trail 70 smoothly.

Furthermore, the base 50 and the stoppers 60 can be used on others slide block 20 after being disengaged from the slide block 20, that is to say that the base 50 and stoppers 60 can be shared by many slide blocks 20 of the same specification. Consequently, the production cost can be reduced.

On the other hand, unlike the conventional retainer that needs to be produced with three different modules, the base 50 of the retainer and the stoppers 60 of the present invention can be made by a single module.

It will be noted that on each of the stopping portions 61 of the stoppers 60 is defined a concave retaining end 63 (as shown in FIG. 2) that are to be compressed by the rolling element, so as to make it easier for the stoppers 60 to pass through the slide block 20.

Figure 9:
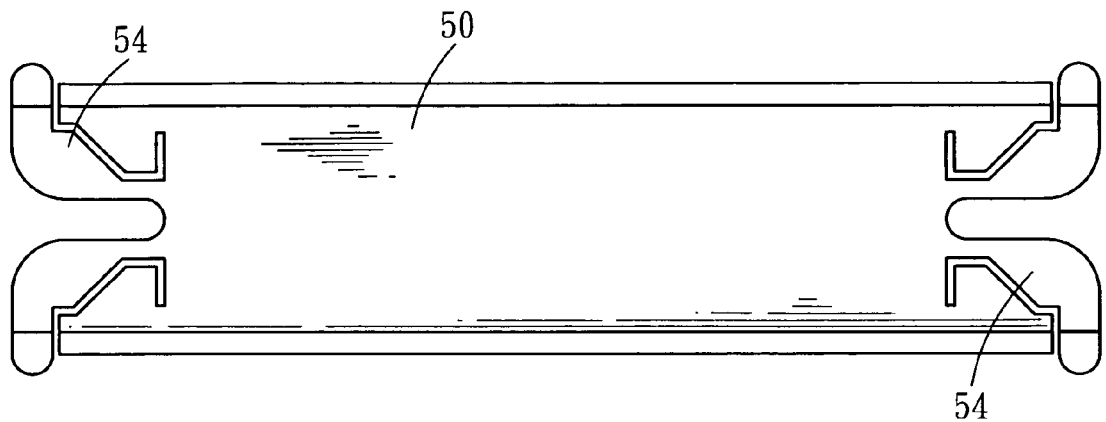
FIG. 9 is an assembly view of the rolling element retainer in accordance with a second embodiment of the present invention.

In the first embodiment, the stoppers 60 are separated from the base 50 of the retainer. According to a second embodiment of the present invention, the stoppers 60 also can be integral with the base 50, as shown in FIG. 9.

In this embodiment, the base 50 is also provided at either end thereof with a flexible and deformable stopping portion 54 having a circular arc shape, and similarly, the stopping portion 54 will extend out of the base 50 when it is not compressed.

Figure 10:
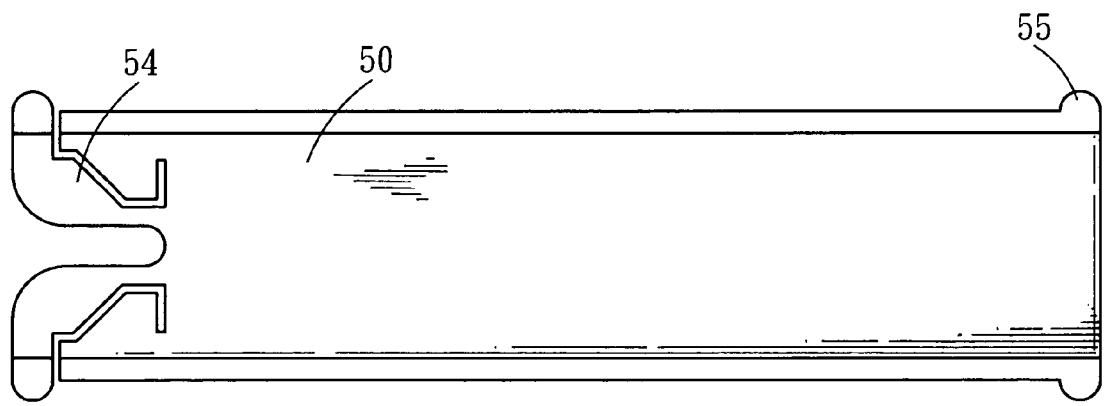
FIG. 10 is an assembly view of the rolling element retainer in accordance with a third embodiment of the present invention.

Referring to FIG. 10, a detachable rolling-element retainer in accordance with a third preferred embodiment of the present invention is similar to that of the second embodiment, except that the base 50 is provided at an end thereof with two opposite stationary stopping portion 55, and the end with the deformable stopping portions 54 is initially inserted into the slide block.

While we have shown and described various embodiments in accordance with the present invention, it should be clear to those skilled in the art that further embodiments may be made without departing from the scope of the present invention.

What is claimed is:

1. A detachable rolling-element retainer comprising:
a slide block defined with a slide groove in which disposed a plurality of rolling elements; and
a base inserted in the slide groove of the slide block and provided at either end thereof with elastic deformable stopping portions, wherein one of the stopping portions is positioned at an end of the slide block after being compressed in to and passing through the slide groove, while another one of the stopping portions is positioned at another end of the slide block, thus enabling the base of the rolling-element retainer to be disengaged from the slide groove of the slide block while preventing disengagement of the rolling elements from the slide block prior to the insertion of a guide rail into the slide groove.

2. The detachable rolling-element retainer as claimed in claim 1, wherein the stopping portions at another end of the base of the rolling-element retainer are stationary.

3. The detachable rolling-element retainer as claimed in claim 1, wherein the stopping portions at either end of the base of the rolling-element retainer are elastic and deformable.

4. The detachable rolling-element retainer as claimed in claim 1, wherein the base is provided with concave retaining portions for mating with the rolling elements and preventing disengagement of the rolling elements from the slide block.

5. The detachable rolling-element retainer as claimed in claim 1, wherein the stopping portions of the base each has circular arc shape.

6. A detachable rolling-element retainer comprising:
a slide block defined with a slide groove in which disposed a plurality of rolling elements; and
a base inserted in the slide groove of the slide block and provided at either end thereof with elastic deformable stopping portions, wherein one of the stopping portions is positioned at an end of the slide block after being compressed in to and passing through the slide groove, while another one of the stopping portions is positioned at another end of the slide block, thus enabling the base of the rolling-element retainer to be disengaged from the slide groove of the slide block while preventing disengagement of the rolling elements from the slide block prior to the insertion of a guide rail into the slide groove, wherein the base of the rolling-element retainer is provided at either end thereof with a cavity in which is disposed a stopper having elastic deformable stopping portions.

7. The detachable rolling-element retainer as claimed in claim 6, wherein a positioning slot is defined in the respective cavities of the base for mating with a protrusive positioning portion of the stopper.

8. The detachable rolling-element retainer as claimed in claim 6, wherein the stopping portions of the base each has circular arc shape.

9. The detachable rolling-element retainer as claimed in claim 6, wherein the stopping portions of the base are provided with concave retaining portions for mating with the rolling elements that are to be compressed by the rolling element, so as to make it easier for the stoppers to pass through the slide block.

* * * * *